(12) United States Patent
Hill et al.

(10) Patent No.: US 7,057,603 B2
(45) Date of Patent: Jun. 6, 2006

(54) NOTEBOOK COMPUTER FORCE-CONTROLLED POINTING STICK DEVICE

(75) Inventors: David Wayne Hill, Cary, NC (US); Naraiki Mieki, Kanagawa (JP); David Andrew Sawin, Durham, NC (US); Hisashi Shima, Kanagawa-Ken (JP); Aaron Michael Stewart, Raleigh, NC (US); Tomoyuki Takahashi, Kanagawa-Ken (JP); Kazuhiko Yamazaki, Hiratsuka (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 371 days.

(21) Appl. No.: 10/063,556

(22) Filed: May 2, 2002

(65) Prior Publication Data

US 2003/0206154 A1    Nov. 6, 2003

(51) Int. Cl.
   *G09G 5/08* (2006.01)
(52) U.S. Cl. ............ 345/161; 345/168; 361/680
(58) Field of Classification Search ........... 345/156, 345/157, 160, 161, 168; 341/22, 34, 33, 341/32; 200/6 A, 5 A; 361/680, 681
See application file for complete search history.

(56) References Cited

U.S. PATENT DOCUMENTS

| | | | |
|---|---|---|---|
| 4,896,003 A * | 1/1990 | Hsieh | 200/6 A |
| 5,541,622 A | 7/1996 | Engle et al. | |
| 5,675,361 A | 10/1997 | Santilli | |
| 5,762,306 A | 6/1998 | Day | |
| 5,870,082 A * | 2/1999 | Selker et al. | 345/168 |
| 5,889,507 A | 3/1999 | Engle et al. | |
| 5,959,616 A | 9/1999 | Challener | |
| 6,067,005 A * | 5/2000 | DeVolpi | 338/47 |
| 6,140,998 A | 10/2000 | Slotta | |
| 6,271,834 B1 | 8/2001 | May et al. | |
| 6,295,050 B1 * | 9/2001 | Kumhyr | 345/161 |
| 6,437,682 B1 * | 8/2002 | Vance | 338/185 |
| 6,525,278 B1 * | 2/2003 | Villain et al. | 200/5 R |
| 6,556,186 B1 * | 4/2003 | Narusawa et al. | 345/168 |
| 6,724,369 B1 * | 4/2004 | Slotta | 345/161 |

FOREIGN PATENT DOCUMENTS

WO    WO 00/58819    * 10/2000

* cited by examiner

*Primary Examiner*—Kent Chang
(74) *Attorney, Agent, or Firm*—Scott W. Reid; Dillon & Yudell LLP

(57) ABSTRACT

A notebook computer force-controlled pointing stick device incorporates a more comfortable cap with enhanced ergonomic features. The device is generally cylindrical in shape and is located between the G, H, and B keys on the computer keyboard. The upper end of the device has a donut-like shape with a concave or crown-shaped central portion that forms well to the user's finger and provides better control, but does not interfere with typing. The upper end preferably has a rubber tip that provides improved control for a finger of a user. In an alternate version, the device is similar in shape to a bicycle saddle.

5 Claims, 3 Drawing Sheets

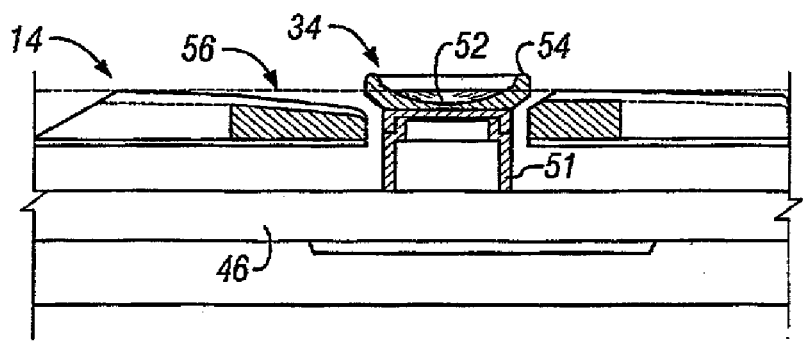
FIG. 5
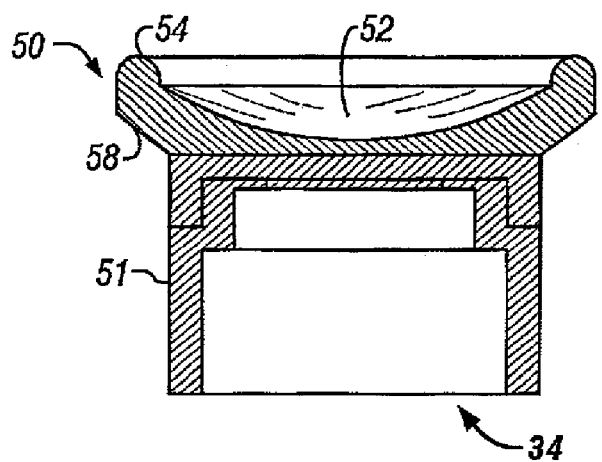
FIG. 6
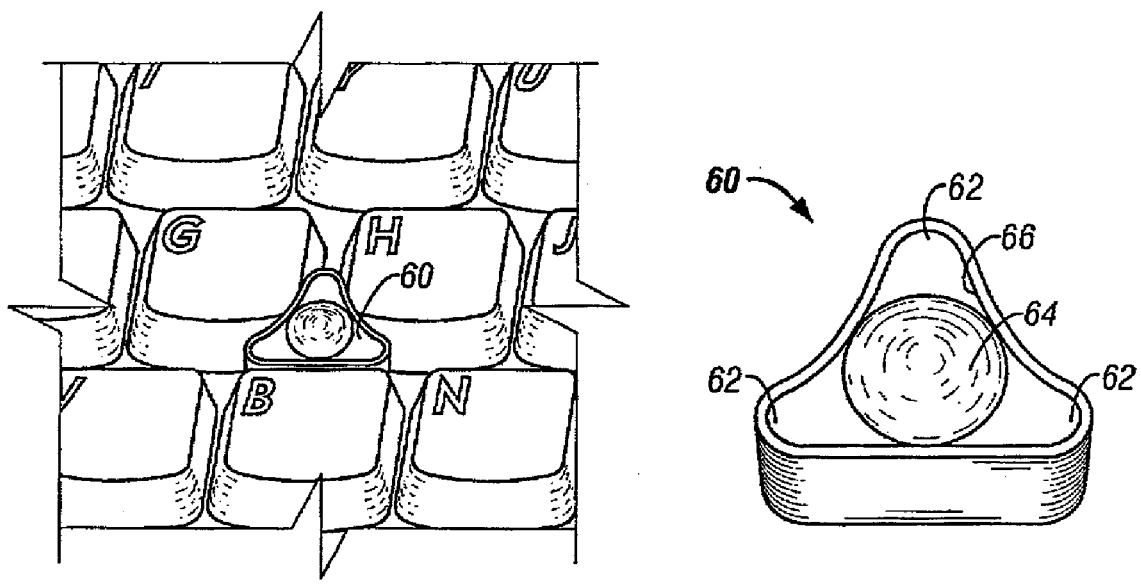
FIG. 7            FIG. 8

NOTEBOOK COMPUTER FORCE-CONTROLLED POINTING STICK DEVICE

BACKGROUND OF INVENTION

1. Technical Field

The present invention relates in general to an improved pointing stick device for a notebook computer, and in particular to an ergonomically enhanced notebook computer force-controlled pointing stick device.

2. Description of the Prior Art

The interactive computer system operating environment, such as that encountered by users of personal computers and the like, is characterized by efforts toward increasing ease of operation and improved ergonomics. An important contribution to making the operation of such computers easier and more convenient is the graphical user interface (GUI). A GUI provides a computer interface that is visually oriented and includes a variety of graphical artifacts displayed on a computer display that make the operation of the computer more intuitive, thereby increasing user efficiency.

A GUI operating system enables a user to move a computer display pointer by using a GUI pointing device, such as a display mouse or track ball, that is attached to the computer. Generating a control input by moving the mouse across a desktop or rolling the track ball in its cradle moves the pointer across the display in the same direction of movement, according to a response function of the pointing device. The relationship between pointing device control input and pointer response on the display screen is intuitive to the user.

Many GUI systems permit multiple programs to be represented simultaneously on the computer display as different display windows. The boundaries of the windows can be adjusted or can be reduced to an icon representation. To activate a program, or to re-enter it, a user targets the display pointer within the desired program window or targets the display icon representing the program and presses a button of the display mouse or track ball device. Pressing the button, also referred to as "clicking" it, activates or re-enters the program. To activate a program without the GUI, a user would need to type the name of an executable file and provide it to the operating system. In this way, the keystrokes needed to activate or re-enter a program are eliminated or at least substantially reduced, making the computer easier and more convenient to use. The ability to point to a desired activity makes learning the operation of the computer easier and more convenient.

Additional improvements to program interaction through graphical user interface display pointer control are rapidly being achieved. For example, IBM Corporation has introduced a display pointer control feature called TrackPoint™ that includes a small, substantially rigid joystick-type actuator imbedded in the center of an otherwise conventional "QWERTY" computer keyboard. The TrackPoint control actuator is located between the G, H and B keys, which are between the hands of a typist at the home position, and is sufficiently short so that it does not interfere with normal typing on the keyboard. A computer user can apply lateral forces to the control actuator with his or her index finger to move the pointer around on the computer display, rather than using a display mouse.

The keyboard provided with the TrackPoint feature includes a pair of click buttons that are located below the middle of the space bar. These buttons duplicate the functions of the display mouse buttons and are easily depressed with a thumb. In this way, the user's hands do not need to leave the keyboard to control the display pointer. The index finger and thumb of the same hand can simultaneously control the joystick-type actuator and either of the click buttons. A keyboard with such an integrated pointing device is especially desirable in a portable computer, having a graphical user interface, where it can be inconvenient or difficult to connect and/or use a mouse or track ball with the computer to control display pointer movement. The IBM Corporation notebook computer is commonly referred to as a ThinkPad™ computer and includes a TrackPoint control actuator of the foregoing type.

The TrackPoint control actuator and associated click buttons significantly reduce the time required for a user to select windows, icons, text commands and other displayed features of a GUI over the conventional approach of manipulating a mouse or track ball physically separated from the keyboard. In addition, the TrackPoint control actuator and associated click buttons are particularly well suited for portable computers which are often used in airplanes, automobiles and other locations that do not have sufficient space for operation of a separate mouse or track ball.

The IBM TrackPoint control actuator which heretofore has been incorporated into commercially available computers typically has a resilient convex cap with a rough "cat's tongue" surface, and a diameter of about 7 mm. Although this design provides the user with good control, it protrudes up above the top or touch surfaces of the keyboard keys. In addition, the firm cap can be uncomfortable for some users as it deforms the user's finger, and its rough surface abrades the skin with can callus the fingertip. When these elements are combined with the convex shape of the current design, which does not provide the user with significant surface area for finger contact, the need to rely more friction/texture is increased. Moreover, novice users may consider the design to be unintuitive because the shape implies that it is a joystick, and thus expect the actuator to move more freely in the x-and-y-axes. Thus, an improved control actuator that overcomes these limitations would be desirable.

SUMMARY OF INVENTION

One embodiment of a notebook computer force-controlled pointing stick device incorporates a more comfortable cap with enhanced ergonomic features. The device is generally cylindrical in shape and is located between the G, H, and B keys on the computer keyboard. The upper end of the device has a donut-like shape with a concave or crown-shaped central portion that forms well to the user's finger and provides better control, but does not interfere with typing. The upper end preferably has a rubber tip that provides improved control for a finger of the user. In an alternate embodiment, the device is similar in shape to a bicycle saddle.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

FIG. 5 is a sectional side view of the keyboard and integrated pointing device of FIG. 4.

FIG. 6 is an enlarged sectional side view of the integrated pointing device of FIG. 4.

FIG. 7 is an isometric view of a portion of a keyboard with an integrated pointing device constructed in accordance with a second embodiment of the present invention.

FIG. 8 is an enlarged isometric view of the integrated pointing device of FIG. 7.

DETAILED DESCRIPTION

Figure 1:
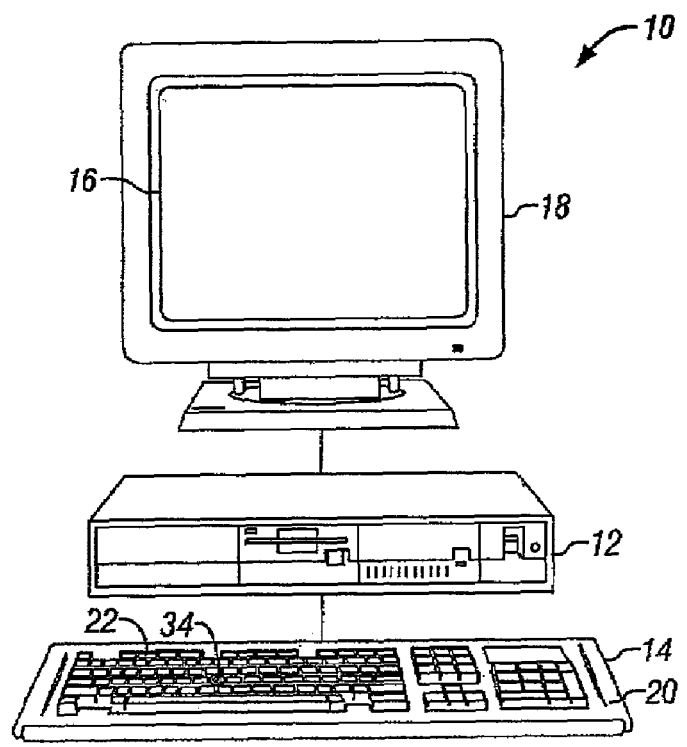
FIG. 1 is a schematic diagram of a computer system having a keyboard with an integrated actuator or pointing device.

Referring to FIG. 1, a computer system 10 comprises a system unit 12 that receives manual control inputs from an attached keyboard unit 14. System unit 12 displays system responses on a display screen 16 of a display device 18. The keyboard unit 14 includes a surrounding frame 20 that supports a plurality of manually depressible keys 22. The keys 22 include the normal twenty-six keys bearing the letters of the alphabet which are arranged in the conventional QWERTY layout. The keys 22 also include conventional F1 through F12 function keys, and other keys such as caps lock, shift, tab, backspace, enter, and so forth. The keyboard unit 14 further includes a space bar key, control keys, alternate keys, etc.

Figure 2:
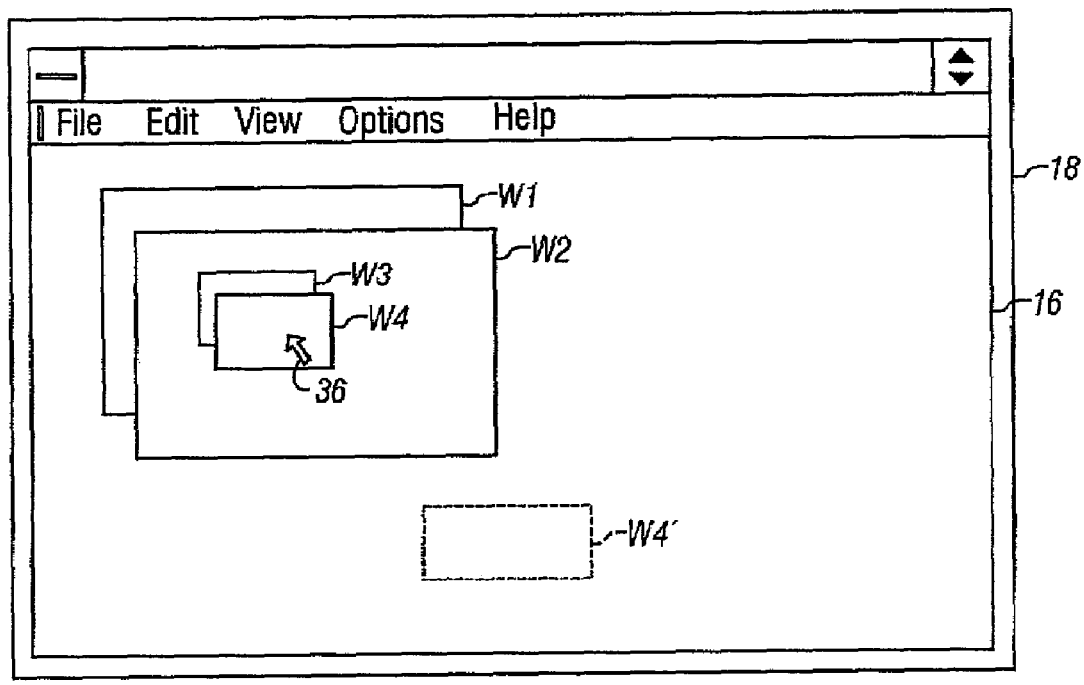
FIG. 2 illustrates a pointer of a graphical user interface that is used to select one of several displayed objects.

The keyboard unit 14 has a small, substantially rigid pointing device or actuator 34 embedded therein between the G, H, and B keys. The actuator 34 can be engaged by the tip of one of the user's fingers. In addition, lateral forces may be applied simultaneously over a 360 degree range in the general horizontal plane of the keyboard unit 14 in order to move an active pointer 36 (FIG. 2) across the display screen 16. By way of example, this enables the user to select one of the windows W1 W2, W3, and W4 displayed by the GUI. It will be understood that the pointer 36 also can be used to select icons, windows, and other commands displayed by the GUI and to designate system tasks, change the display, and so forth. The actuator 34 preferably comprises a small, vertically-oriented post with a cap on its upper end. The lower end of the post is rigidly secured to a force transducer (not illustrated), preferably in the form of a thin film resistive strain gage or capacitive forms as is known in the art. Means for integrating actuator 34 into operation of computer system 10 may comprise, for example, those disclosed in U.S. Pat. No. 6,271,834, which is incorporated herein by reference.

Figure 3:
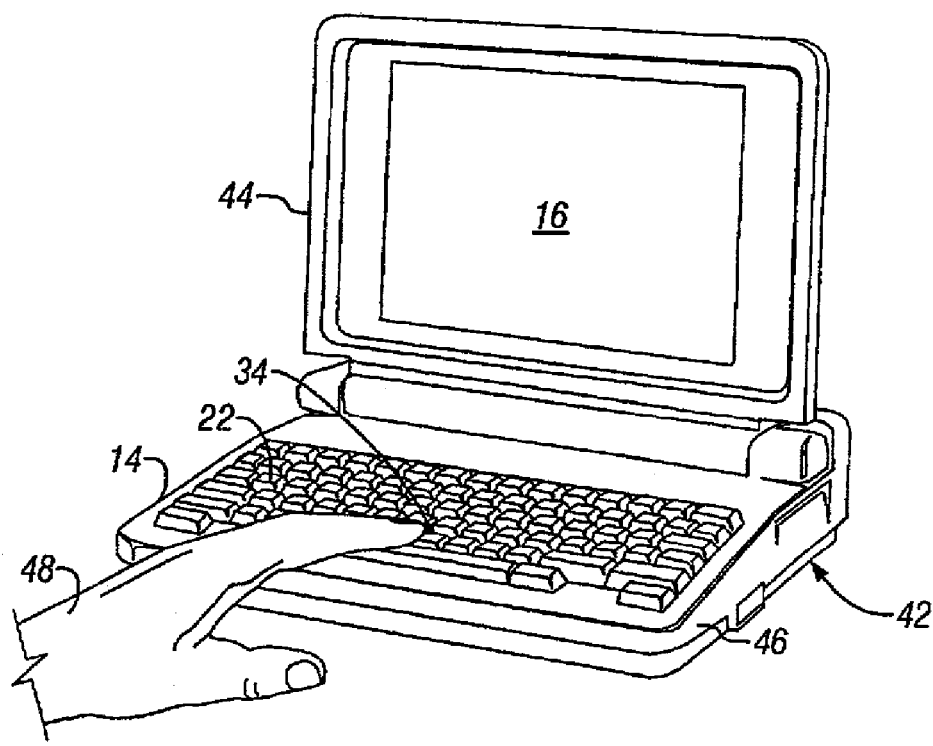
FIG. 3 is an isometric view of a notebook computer having a keyboard with the integrated pointing device.

FIG. 3 illustrates a notebook computer 42 equipped with the keyboard unit 14 and incorporating the display screen 16. The display screen 16 is carried on the inside of a lid 44 that is attached via a hinge to the base 46 of the notebook computer. The lid 44 can be closed to conceal the keyboard unit 14. In FIG. 3, the index finger of a user's left hand 48 is shown in engagement with the actuator 34.

Figure 4:
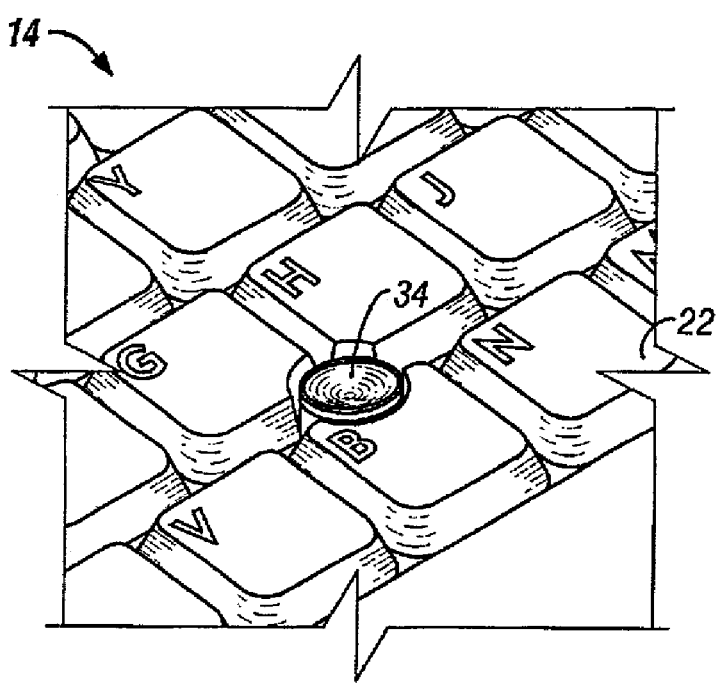
FIG. 4 is an isometric view of a portion of the keyboard with the integrated pointing device constructed in accordance with a first embodiment of the present invention.

Referring now to FIGS. 4–6, detailed illustrations of a first embodiment of the actuator 34 constructed in accordance with the present invention is shown. As best shown in FIG. 6, the upper end of actuator 34 comprises two primary components: a protrusion 50 mounted on top of a substantially cylindrical base 51. Protrusion 50 has a shallow concave aperture 52 in its upper surface, all of which are integrally formed. Protrusion 50 is circumscribed by an integral, donut-like annular rim 54, the inner surface of which defines the perimeter of aperture 52. Unlike base 51 which is a rigid structural support component, protrusion 50 is preferably formed from an elastomeric or rubber material that is resilient (relatively high durometer) to provide better leverage for improved user performance. However, protrusion 50 also can be deformed slightly or flared, but not flattened, when depressed by the user's finger. Protrusion 50 flares because it is stretching, rather than collapsing. The resilient material selected for protrusion 50 is important so as to allow the user to retain greater fine motor control of the pointing device than allowed by prior art materials. another version, protrusion 50 may be formed from the same material as base 51 to further ensure responsiveness.

One of the advantages of this design is the lower profile of actuator 34 that is achieved compared to prior art designs. As shown in FIG. 5, the top surfaces of the keys 22 in keyboard 14 define an imaginary plane 56. Note that the only portion of actuator 34 that extends above plane 56 is the tip of rim 54. In other words, less than 0.5 mm of actuator 34 is located above plane 56. This feature decreases the risk of interference with the fingers of the user as the user is typing. Moreover, the entire surface of concave aperture 52, which is the portion of actuator 34 touched by the user (approximately 1 to 1.4 mm in depth) is located below the imaginary plane 56, as is base 51.

Another significant advantage of the present invention is derived from the maximum diameter of protrusion 50 (approximately 8.5 mm) being greater than that of its underlying structural support base 51 (approximately 6 mm or less in diameter). The diameter of base 51 allows the G, H, and B keys of keyboard 14 to be located close together. In addition, the outer surface of protrusion 50 has a generally conical flare 58 that extends between base 51 and rim 54. The flare 58 and resilient material selection of protrusion 50 further minimizes the clearance required between the keys to accommodate actuator 34. As shown in FIG. 5, the size of the present design also allows the G, H, and B keys to retain almost the same amount of key top area (upper surface area of the keys touched by the user's fingers) as the other alphabetic keys 22. At the same time, the concave design of actuator 34 maintains a much lower height or profile for actuator 34 than is available for some conventional convex designs.

Referring now to FIGS. 7 and 8, an alternate embodiment of the present invention is illustrated as actuator 60. The upper end of actuator 60 is configured in a bicycle saddle-like shape with three distinct projections 62, and a central concave aperture 64 in its upper surface. Actuator 60 is mounted on top of a structural support base (not shown). The upper edge of actuator 60 is circumscribed by an integral rim 66 that is similar to rim 54 of actuator 34. Actuator 60 is preferably formed from a resilient elastomeric material to provide better leverage for improved user performance. Like actuator 34, actuator 60 maintains a lower height or profile than some prior art designs. Moreover, the three projections 62 extend into the pre-existing spaces and inclined side surfaces of the G, H, and B keys, thereby reducing the footprint and height profile of actuator 60. This feature decreases the risk of interference with the fingers of the user as the user is typing.

A computer pointing device constructed in accordance with the present invention has several advantages over conventional designs. The concave shape gives the user an intuitive cue of where to place one's finger and how to actuate the pointer. The present device minimally protrudes above the top or touch surfaces of the keyboard keys, which minimizes typing interference. This design also avoids the rough "cat's tongue" surface with a softer material that is more comfortable and does not abrade the skin. The resilience and leverage that the pointing device provides is a notable improvement over prior art devices, which typically require friction and/or adhesion and are less comfortable to the user. When the present invention is used in portable computers with hinged monitors that close on top of the keyboard, the extremely low profile of the present actuator prevents potentially damaging contact between the actuator and the surface of the monitor. This design can also be used to scroll vertically or horizontally on supporting application windows.

While the invention has been shown or described in only some of its forms, it should be apparent to those skilled in the art that it is not so limited, but is susceptible to various changes without departing from the scope of the invention.

The invention claimed is:

1. A computer system, comprising:
    a system unit;
    a keyboard interconnected with the system unit and having a plurality of keys, wherein upper ends of the keys define a plane;
    a pointing actuator mounted to the keyboard between selected ones of the keys for manipulation by a user's finger
    wherein at least a portion of an upper end of the actuator is located beneath the plane defined byte upper ends of the keys; and
    wherein the upper end of the actuator has a perimeter above the plane with an upper surface area defined therein, wherein the upper surface area, excluding said perimeter, is located beneath the plane.

2. A computer system, comprising:
    a system unit;
    a keyboard interconnected with the system unit and having a plurality of keys, wherein upper ends of the keys define a plane;
    a pointing actuator mounted to the keyboard between selected ones of the keys for manipulation by a user's finger;
    wherein at least a portion of an upper end of the actuator is located beneath the plane defined by the upper ends of the keys;
    wherein the upper end of the actuator has a perimeter above the plane with an upper surface area defined therein, wherein the upper surface area, excluding said perimeter, is located beneath the plane; and
    wherein the upper end of the actuator is configured in a bicycle saddle-like shape.

3. The computer system of claim 2 wherein projections of the actuator extend into spaces between the G, H, and B keys of the keyboard.

4. The computer system of claim 2 wherein the upper end of the actuator is circumscribed by an integral rim, the inner surface of the rim defining the upper surface, and an exposed portion of the actuator is formed from a resilient elastomeric material.

5. The computer system of claim 2 wherein an exposed portion of the actuator is mounted to an underlying rigid structural support base.

* * * * *

UNITED STATES PATENT AND TRADEMARK OFFICE
CERTIFICATE OF CORRECTION

PATENT NO. : 7,057,603 B2 Page 1 of 1
APPLICATION NO. : 10/063556
DATED : June 6, 2006
INVENTOR(S) : Hill et al.

It is certified that error appears in the above-identified patent and that said Letters Patent is hereby corrected as shown below:

Column 6, line 2, delete "byte" and insert --by the--.

Signed and Sealed this

Twelfth Day of December, 2006

JON W. DUDAS
*Director of the United States Patent and Trademark Office*